United States Patent
Kim et al.

(10) Patent No.: US 7,555,312 B2
(45) Date of Patent: Jun. 30, 2009

(54) DETACHABLE MOBILE TERMINAL FOR IMAGE COMMUNICATION AND OPERATING METHOD THEREOF

(75) Inventors: Eun-Mi Kim, Seoul (KR); Yoo-Seok Cho, Seoul (KR); Dong-Eun Kim, Seoul (KR); Jung-Pil Yun, Seoul (KR)

(73) Assignee: LG Electronics, Inc., Seoul (KR)

( * ) Notice: Subject to any disclaimer, the term of this patent is extended or adjusted under 35 U.S.C. 154(b) by 422 days.

(21) Appl. No.: 11/009,734

(22) Filed: Dec. 9, 2004

(65) Prior Publication Data

US 2005/0124381 A1    Jun. 9, 2005

(30) Foreign Application Priority Data

Dec. 9, 2003    (KR) .................. 10-2003-0089111

(51) Int. Cl.
*H04M 1/00* (2006.01)

(52) U.S. Cl. ............... 455/556.1; 455/553.1; 455/90.3; 455/557; 455/575.1; 455/575.4; 379/433.13; 379/433.04; 379/433.07; 379/433.12; 348/14.04; 348/207.99; 348/14.02; 439/1

(58) Field of Classification Search ............... 455/90.3, 455/90.2, 550.1, 552.1, 553.1, 556.1, 556.2, 455/557, 556, 575.1, 575.3, 575.4, 575.8, 455/566, 575; 379/433.12, 433.13, 433.07, 379/433.04; 348/14.04, 207.99, 14.02; 439/1
See application file for complete search history.

(56) References Cited

U.S. PATENT DOCUMENTS

| | | | | |
|---|---|---|---|---|
| 5,491,507 A | * | 2/1996 | Umezawa et al. | 348/14.02 |
| 5,719,936 A | * | 2/1998 | Hillenmayer | 379/447 |
| 6,009,336 A | * | 12/1999 | Harris et al. | 455/566 |
| 6,131,018 A | * | 10/2000 | De Crouy-Chanel et al. | 455/572 |
| 6,226,189 B1 | * | 5/2001 | Haffenden et al. | 361/814 |
| 6,657,654 B2 | * | 12/2003 | Narayanaswami | 348/14.04 |
| 7,212,845 B2 | * | 5/2007 | Ikeuchi | 455/575.3 |
| 2002/0051060 A1 | * | 5/2002 | Wada | 348/207 |
| 2002/0058536 A1 | * | 5/2002 | Horii et al. | 455/566 |
| 2002/0102866 A1 | * | 8/2002 | Lubowicki | 439/1 |
| 2002/0118824 A1 | | 8/2002 | Yun | 379/428.01 |
| 2003/0171133 A1 | * | 9/2003 | Mizuta et al. | 455/550 |
| 2005/0014527 A1 | * | 1/2005 | Chambers et al. | 455/556.1 |

FOREIGN PATENT DOCUMENTS

CN    1170329    1/1998

(Continued)

*Primary Examiner*—Edward Urban
*Assistant Examiner*—Junpeng Chen
(74) *Attorney, Agent, or Firm*—Lee, Hong, Degerman, Kang & Waimey (57) ABSTRACT

A mobile terminal comprising a first body comprising an image receiving unit, an image output unit, a first sound output unit, a first information input unit and a wireless communication module, a second body comprising a second information input unit, a second sound input unit, a second sound output unit and a wireless communication module, wherein the second body is capable of being slidingly mounted to the first body and separated from the first body, and a locking unit for preventing separation of the second body from the first body, wherein the wireless communication modules of the first body and the second body are capable of wirelessly communicating with each other when the first body and the second body are detached from each other.

24 Claims, 9 Drawing Sheets

FOREIGN PATENT DOCUMENTS

| | | |
|---|---|---|
| CN | 2298624 Y | 11/1998 |
| CN | 1353557 | 6/2002 |
| EP | 0 414 365 A2 | 7/1990 |
| EP | 1 220 517 A1 | 7/2002 |
| EP | 1 307 030 A2 | 5/2003 |
| EP | 1 307 030 A3 | 8/2003 |
| EP | 1 455 505 A1 | 9/2004 |
| JP | 08-186517 | 7/1996 |
| JP | 09-205476 | 8/1997 |
| JP | 10-070485 | 3/1998 |
| JP | 10-243065 | 9/1998 |
| JP | 11-508104 | 7/1999 |
| JP | 11331332 | 11/1999 |
| JP | 2002-176476 | 6/2002 |
| JP | 2002-232540 | 8/2002 |
| JP | 2003-032344 | 1/2003 |
| JP | 2003-110675 | 4/2003 |
| JP | 2003110675 A * | 4/2003 |
| JP | 2003-348204 | 12/2003 |
| KR | 010048086 A | 6/2001 |
| KR | 1020030038390 A | 5/2003 |
| KR | 1020030041614 A | 5/2003 |

* cited by examiner

DETACHABLE MOBILE TERMINAL FOR IMAGE COMMUNICATION AND OPERATING METHOD THEREOF

CROSS-REFERENCE TO RELATED APPLICATIONS

Pursuant to 35 U.S.C. § 119(a), this application claims the benefit of earlier filing date and right of priority to Korean Application No. 10-2003-89111, filed on Dec. 9, 2003, the contents of which is hereby incorporated by reference herein in its entirety.

BACKGROUND OF THE INVENTION

1. Field of the Invention

The present invention relates to a detachable mobile terminal, and more particularly, to a detachable mobile terminal for image communication and an operating method thereof capable of providing image communication through a first body and voice communication through a second body, wherein the first body and the second body are in wireless communication while physically being separated from each other.

2. Description of the Related Art

Generally, a mobile terminal is used for wireless voice communication. However, because various techniques for the mobile terminal have been developed, a user is able to receive multimedia services through the Internet, photograph objects using a camera mounted to the mobile terminal, and communicate images to another party. Hence, the usable range of the mobile terminal is being gradually widened.

However, an existing mobile terminal capable of image communication is disadvantageous. A camera for transmitting an image to another party, a display unit for displaying an image of the other party and a voice transmitting/receiving unit for transmitting and receiving a voice signal are all integrally mounted on the mobile terminal. Preferably, a user should be able to simultaneously talk with and listen to the other party while viewing an image of or sending an image to the other party. However, because the modules for image transmission/reception and voice communication are mounted on the same structure, such simultaneous communication is not possible.

In an attempt to solve this problem, a prior art mobile terminal provides for an integrated module unit, including a liquid crystal display screen and a camera, to be separated from the terminal main body. Although the integrated module unit is separated from the terminal main body, image communication is maintained by connecting the terminal main body and the integrated module unit with a cable. However, such a mobile terminal is also disadvantageous because of the use of the cable, which is inconvenient to use and hinders mobility.

SUMMARY OF THE INVENTION

The present invention is directed to a detachable mobile terminal for image communication and an operating method thereof capable of providing an image through a first body and a voice communication through a second body, wherein the second body is capable of wirelessly communicating with the first body.

To achieve these and other advantages and in accordance with the purpose of the present invention, as embodied and broadly described herein, a detachable mobile terminal for image communication and method is provided. The mobile terminal in one embodiment comprises a first body comprising an image receiving unit, an image output unit, a first sound input unit, a first sound output unit, a first information input unit and a wireless communication module, a second body comprising a second information input unit, a second sound input unit, a second sound output unit and a wireless communication module, wherein the second body is capable of being slidingly mounted to the first body and separated from the first body, and a locking unit for preventing separation of the second body from the first body, wherein the wireless communication modules of the first body and the second body are capable of wirelessly communicating with each other when the first body and the second body are detached from each other.

The mounting receptacle is formed at a surface of the first body for mounting the second body and is recessed from a surface of the first body at a predetermined depth and corresponds to a size and a shape of the second body. The guiding rails are formed at side walls of the mounting receptacle at a predetermined length for slidingly mounting the second body onto the mounting receptacle and guiding grooves are formed at side surfaces of the second body for operating with the guiding rails.

In an exemplary embodiment, the locking unit comprises a first locking hole formed at a side wall of the mounting receptacle and a stopper protruded from a side wall of the second body. The stopper is capable of being depressed into the side wall of the second body when the second body is slid along the guiding rail. The stopper is also insertable in the first locking hole for locking the second body by the first body with a portion of the second body exposed outside of an outer circumferential surface of the first body. The mobile terminal may comprise a first release button formed on the first body at the first locking hole, the first release button having a portion exposed outside of the first body for applying a vertical contact force to the stopper for releasing the stopper from the first locking hole.

In another exemplary embodiment, the locking unit comprises a second locking hole formed at a side wall of the mounting receptacle, wherein the stopper of the second body is insertable in the second locking hole for fully mounting the second body at the mounting receptacle. The mobile terminal may comprise a second release button formed on the first body at the second locking hole, the second release button having a portion exposed outside of the first body for applying a vertical contact force to the stopper for releasing the stopper from the second locking hole.

In a further embodiment, the second body is locked by the first body with the second information input unit and the second sound input unit exposed. Moreover, the second body may be separated from the first body when the stopper is separated from the first locking hole. Also, an end of a protruded cover of the stopper is curved.

In another embodiment, a lattice type terminal connected to a circuit unit of the first body is formed at a surface of the first release button and a lattice type terminal connected to a circuit unit of the second body is formed at a surface of the stopper. The lattice type terminal of the first release button and the lattice type terminal of the stopper can exchange a signal when the stopper is inserted in the first locking hole and contacts the first release button.

In accordance with one aspect of the invention the locking unit comprises a first hooking groove recessed from a side surface of the second body where a guiding groove is formed, a second hooking groove recessed from a side surface of the second body where the guiding groove is formed, wherein the second hooking groove is positioned above the first hooking groove in a direction that the second body is slidingly mounted to the first body, and a hooking member formed at a side surface of the mounting receptacle and hooked at one of the first and the second hooking grooves when the second body is slid along the guiding rail in a direction of being separated from the first body.

The hooking member comprises a button portion having a portion exposed outside of the first body for allowing and external force to be applied to the button portion, a hook portion inserted in one of the first and the second hooking grooves for hooking the second body to the first body, a connecting portion formed integrally between the button portion and the hook portion and rotated on a rotary shaft protruded from a central portion of the connecting portion for releasing the hook portion from one of the first and the second hooking grooves when the force is applied to the button portion, and a coil spring mounted at the rotary shaft for applying an elastic force to the connecting portion for restoring the hooking member to an original position.

A surface of the hook portion and surfaces of the first and the second hooking grooves which contact the surface of the hook portion when the second body is slid in a direction of being mounted at the first body are formed with a curved profile. When the hook portion is hooked at the first hooking groove, a portion of the second body is exposed outside of an outer circumferential surface of the first body, wherein a second information input unit and a second sound input unit of the second body are exposed outside. When the hook portion is hooked at the second hooking groove, the second body is fully mounted at the first body.

The image receiving unit is rotatably installed at a side of the first body. The image receiving unit comprises a camera module and a flash.

A first radio signal exchange terminal connected to the wireless communication module of the first body is formed at a side of the first body and a second radio signal exchange terminal connected to the wireless communication module of the second body is formed at a side of the second body. When the second body is separated from the first body, the first body and the second body wireless communicate with each other through the first and the second radio signal exchange terminals. Moreover, wireless communication through the wireless communication modules employs one of a bluetooth method, an IrDA method and a radio frequency (RF) method or other personal area network method.

The image output unit outputs a plurality of images displayed on a main region and an auxiliary region of the image output unit, wherein the image output unit outputs images of a receiving side and a transmitting side.

In accordance with another aspect of the invention, a mobile terminal comprises a first body comprising an image receiving unit, an image output unit, a first sound input unit, a first sound output unit, a first information input unit and a wireless communication module, a second body comprising a second information input unit, a second sound input unit, a second sound output unit and a wireless communication module, the second body capable of being slidingly mounted to the first body and separated from the first body, and a locking unit for fully mounting the second body at the first body without the second information input unit, the second sound input unit and the second sound output unit exposed and for partially mounting the second body at the first body with the second information input unit and the second sound input unit exposed, wherein the wireless communication modules of the first body and the second body are capable of wirelessly communicating with each other when the first body and the second body are detached from each other.

In accordance with yet another aspect of the invention an operating method of a mobile terminal including a first body including an image receiving unit, an image output unit, a first sound input unit, a first sound output unit and a first information input unit, a second body including a second information input unit, a second sound receiving unit and a second sound output unit, the second body capable of being slidingly mounted to the first body and separated from the first body, and a locking unit for fully mounting the second body at the first body without the second information input unit, the second sound input unit and the second sound output unit exposed and for partially mounting the second body at the first body with the second information input unit and the second sound input unit of the second body exposed, comprises detecting whether the first body and the second body are separated from each other, and making the first body and the second body communicate with each other wirelessly when it is detected that the first body and the second body are separated from each other. Image communication is made through the image output unit of the first body and voice communication is made through the second sound input unit and the second sound output unit of the second body. Wireless communication between the first body and the second body employs one of a bluetooth method, an IrDA method and a radio frequency (RF) method or other personal area network method.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

One or more embodiments of the present invention relate to a detachable mobile terminal capable of providing image communication through a first body and voice communication through a second body, wherein the first body and the second body are in wireless communication while physically being separated from each other.

Figure 1:
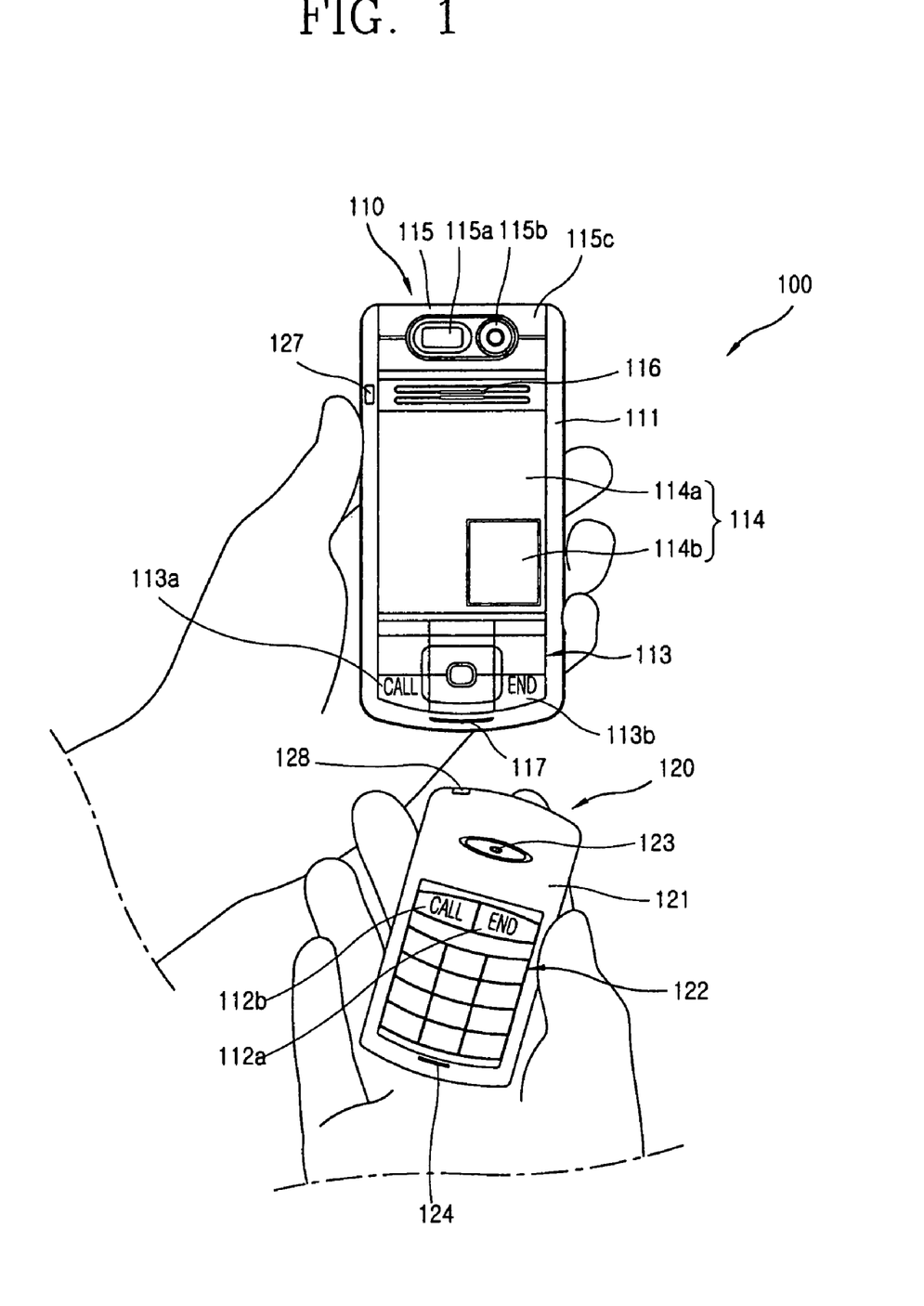
FIG. 1 is a front view of a detachable mobile terminal having a first body and a second body in accordance with one embodiment of the invention.
Figure 5:
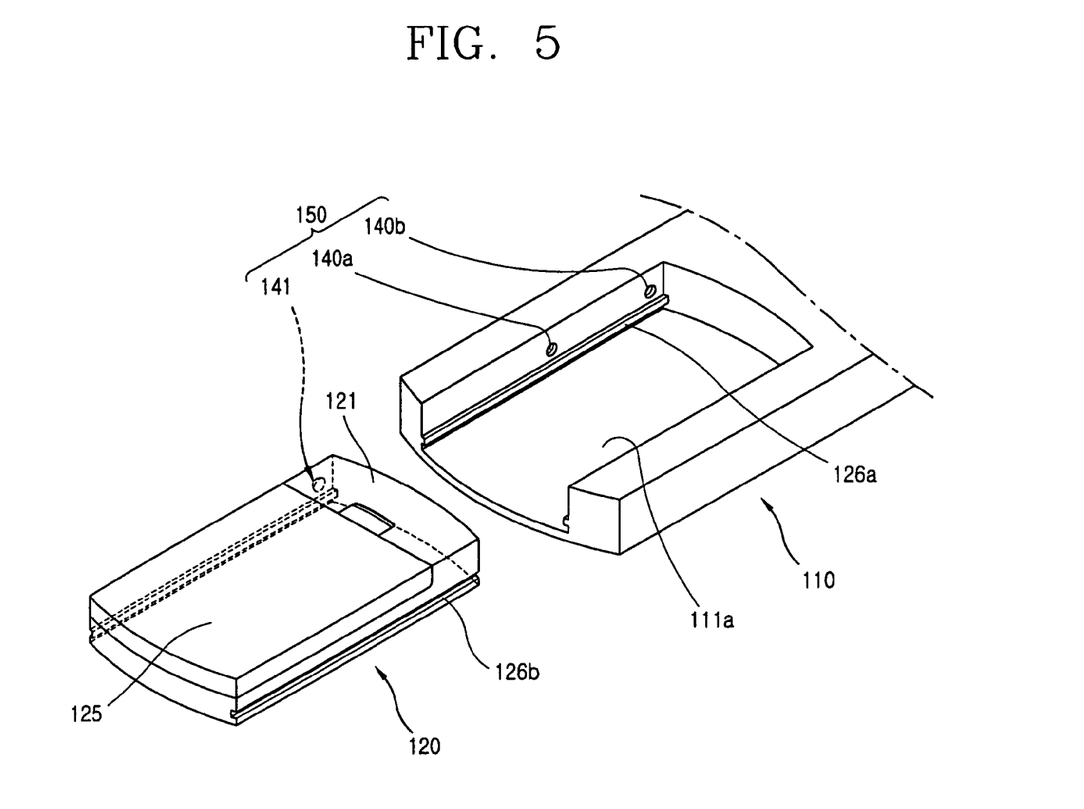
FIG. 5 is a perspective view of a locking unit of a detachable mobile terminal in accordance with one embodiment of the invention.
Figure 10:
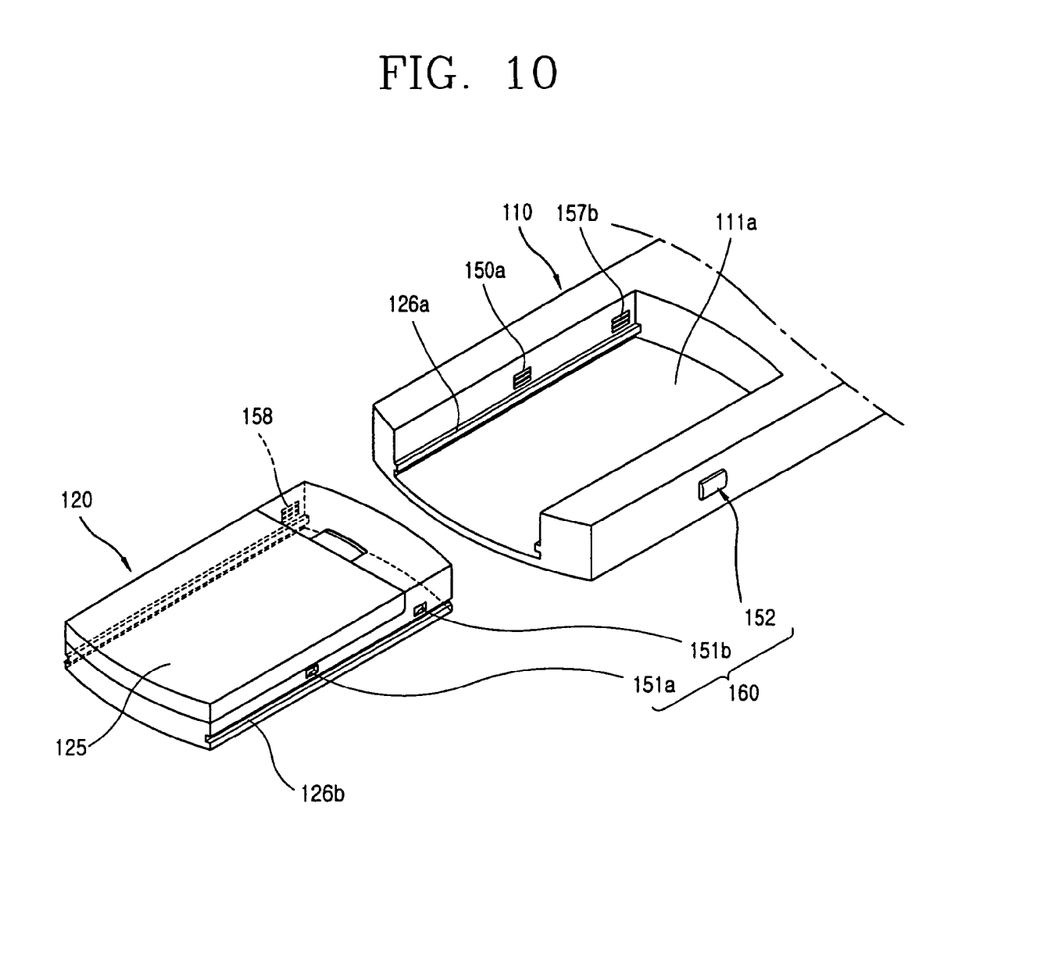
FIG. 10 is a perspective view of a locking unit of a detachable mobile terminal in accordance with one embodiment of the invention.

Referring to FIG. 1, a detachable mobile terminal for image communication comprises a first body 110, a second body 120 and a locking unit 150, as shown in FIG. 5, or a locking unit 160, as shown in FIG. 10. The second body 120 is slidably mounted to and separated from the first body 110. The locking unit 150, 160 prevents the second body 120 from being separated from the first body 110.

Figure 3:
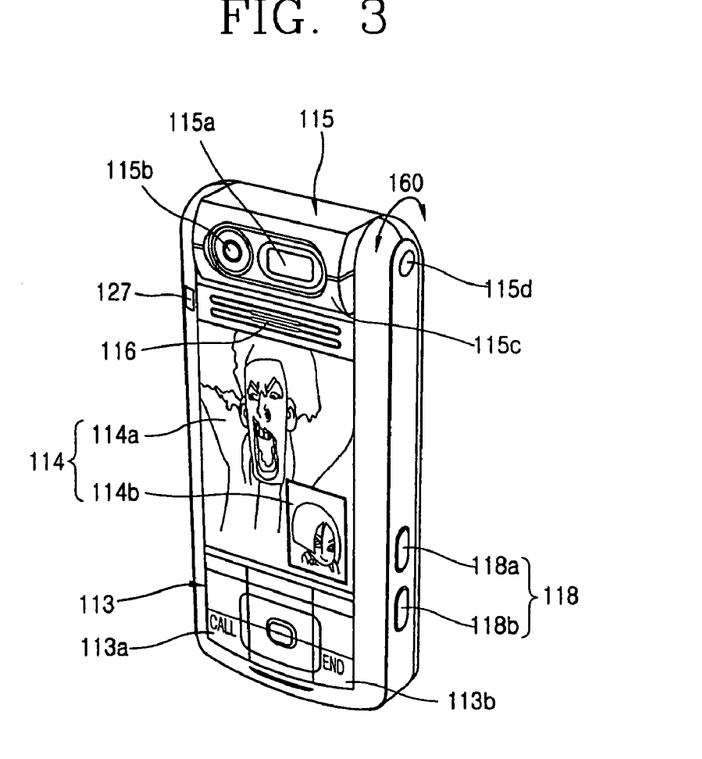
FIG. 3 is a perspective view of a first body of a detachable mobile terminal in accordance with one embodiment of the invention.

Preferably, the first body 110 comprises an image output unit 114 for displaying various images on the mobile terminal. For example, user information pertaining to the terminal, an image of an object taken by a camera of the terminal or an image transmitted by another party to the terminal can all be displayed on the image output unit 114. The first body 110 further comprises a case 111 for encompassing the image output unit 114. Preferably, the case is formed of a plastic by injection molding. A first sound output unit 116 is formed at a surface of the case 111 where the image output unit 114 is also formed. The first sound output unit 116, such as a speaker, amplifies and outputs various sounds including a voice of another party received by the terminal. A first sound input unit 117, such as a microphone, is also formed at a surface of the case 111 where the image output unit 114 is formed. The first sound input unit 117 inputs various sounds to the mobile terminal including a voice of a user. An image receiving unit 115 is mounted at an upper end of the case 111. As shown in FIG. 3, the image receiving unit 115 is preferably rotated on the basis of a rotation shaft 115*d* in a direction 160 so as to photograph an object.

The first body 110 further comprises a first information input unit 113 preferably constructed as a key pad at a lower end of the image output unit 114. The first information input unit 113 has various functions. For example, it may control an image displayed on the image output unit 114 as well as start and end a communication.

The image receiving unit 115 comprises a camera module 115*a* for photographing an object. The camera module is capable of photographing a still image as well as a moving image by rotating the image receiving unit along the rotation shaft 115*d*. The image receiving unit may further comprise a flash 115*b* to aid photography in inadequate light.

Figure 2:
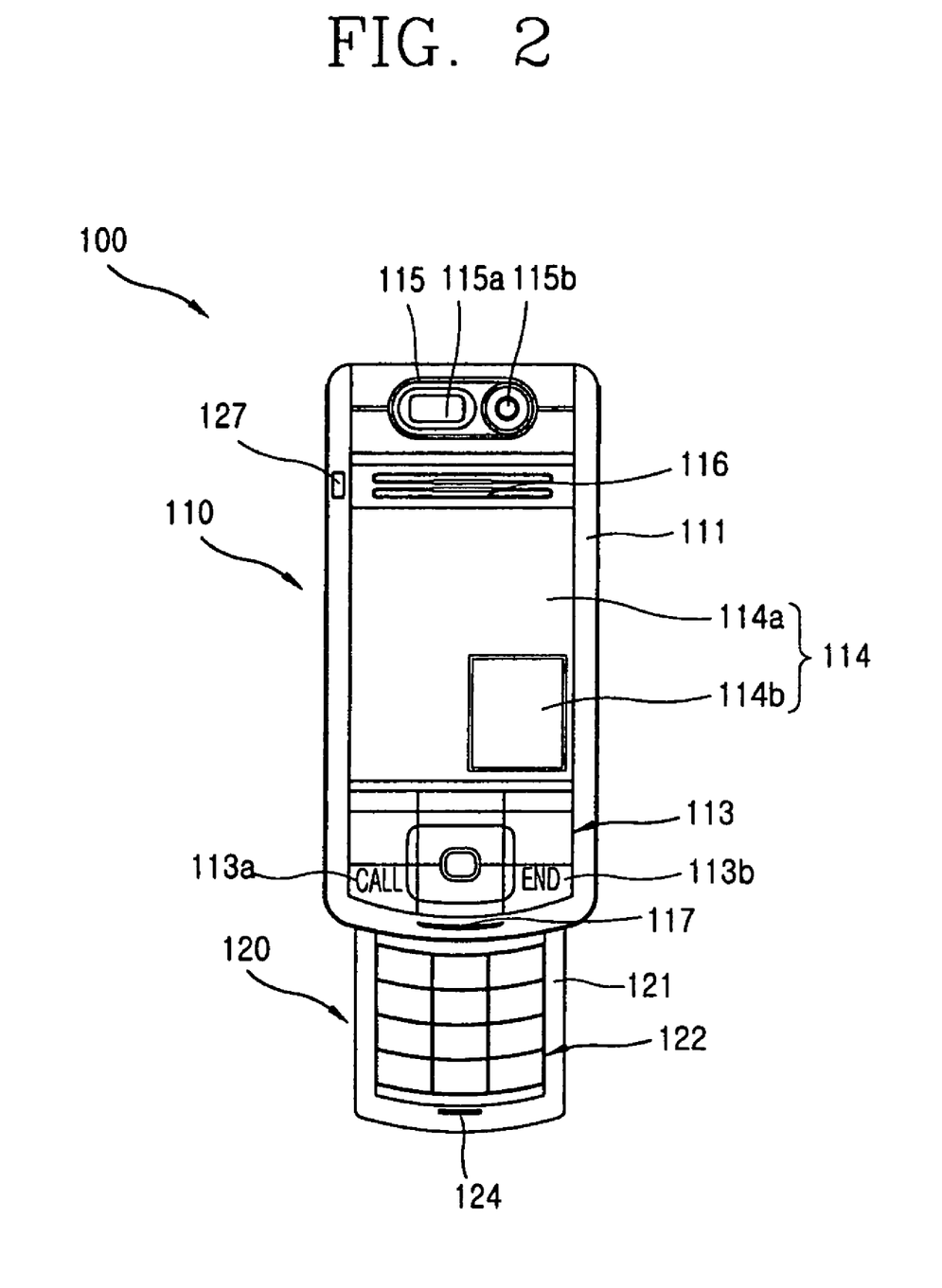
FIG. 2 is a front view of a detachable mobile terminal having a second body mounted to a first body with a portion of the second body exposed in accordance with one embodiment of the invention.

The image output unit 114 can output multiple images according to a selected image mode using the first information input unit 113. As shown in FIGS. 1-3, a first image may be displayed at a main region 114*a* over at least a majority area of the image output unit 114. A second image may be displayed at an auxiliary region 114*b* over a small area of the image output unit 114. During image communication, an image of another party may be displayed at the main region 114*a*. Simultaneously, an image of a user may be displayed at the auxiliary region 114*b* while being transmitted to the other party. Conversely, an image of the user may be outputted to the main region 114*a* and an image of the other party may be outputted to the auxiliary region 114*b*.

Figure 4:
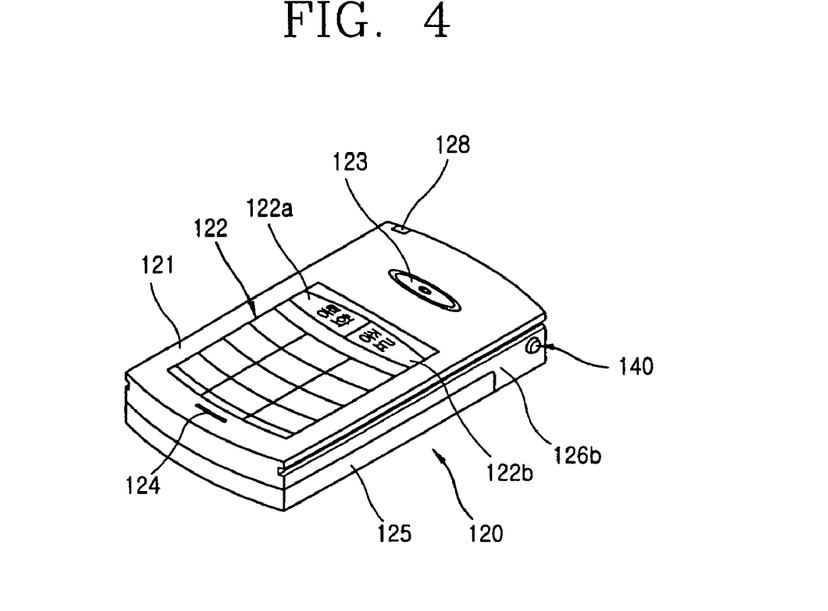
FIG. 4 is a perspective view of a second body of a detachable mobile terminal in accordance with one embodiment of the invention.
Figure 6:
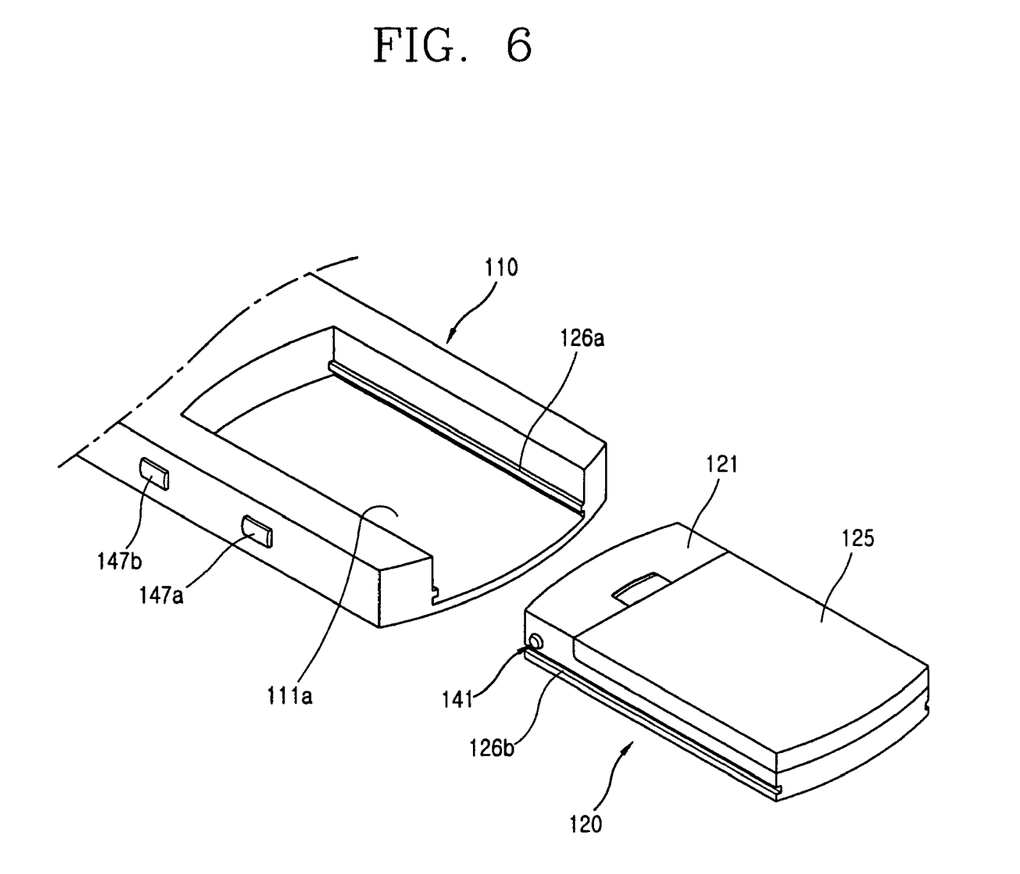
FIG. 6 is a perspective view of FIG. 5 viewed from a different direction.

Preferably, the second body 120 comprises a second information input unit 122 constructed as a keypad for inputting various information, such as an address or a phone number. The second information input unit 122 also functions to start and end a communication when the second body 120 is separated from the first body 110. The second body 120 further comprises a case 121 for encompassing the second information input unit 122. Preferably, the case is formed of plastic by injection molding. A second sound output unit 123, such as a speaker, formed at an upper end of the case 121 outputs various sounds including a voice of another party received by the mobile terminal. A second sound input unit 124, preferably a microphone, formed at a lower end of the case 121 inputs various sounds to the mobile terminal including a voice of a user. Referring to FIGS. 4-6, a battery 125 for supplying power to the mobile terminal is mounted at a back surface of the case 121. A battery (not shown) is also installed in the first body 110 for supplying power to the first body 110 when the second body 120 is separated from the first body 110.

Wireless communication modules are respectively installed at the first body and the second body. Specifically, as shown in FIGS. 1 and 3, a first radio signal exchange terminal 127 connected to the wireless communication module installed in the first body 110 is formed at a side of the first body 110, and a second radio signal exchange terminal 128 connected to a wireless communication module installed in the second body 120 is formed at a side of the second body 120 so as to communicate with the first radio signal exchange terminal 127. Thereupon, when the second body 120 is separated from the first body 110, the first body 110 and the second body 120 can wirelessly communicate with each other through the first and second radio signal exchange terminals 127 and 128. Preferably, wireless communication through the wireless communication modules may employ any one of a number of wireless communication methods such as a bluetooth (BT) method, an IrDA method and a radio frequency (RF) method or other personal area network method.

Hereinafter, a detachable mobile terminal for image communication in accordance with one embodiment of the invention will be described, wherein the second body 120 is slidingly mounted to the first body 110 and separated therefrom. As shown in FIGS. 3 to 6, a mounting receptacle 111*a* at which the second body is mounted is formed at a surface of the first body 110 so that the second body 120 can be slidingly received in the first body 110. The mounting receptacle 111*a* matches with a size and a shape of the second body 120. Additionally, the mounting receptacle 111*a* is preferably recessed from a surface of the first body at a predetermined depth so that the combined thickness of the terminal after the second body 120 is mounted at the first body 110 is minimized.

Guiding rails 126*a* of predetermined length are protruded from both side walls of the mounting receptacle 111*a* in a direction that the second body 120 is sliding. Accordingly, guiding grooves 126*b* of predetermined length are formed at both side surfaces of the second body. The guiding grooves 126*b* operate with the guiding rails 126*a* so that the second body 120 can be slidingly mounted to the first body 110 along the guiding rails 126*a*. Alternatively, guiding rails may be formed on the second body 120, wherein the guiding rails engage with guiding grooves formed on the side walls of the mounting receptacle 111*a* of the first body 110 so that the second body can be slidingly mounted to the first body.

A locking unit 150 of the mobile terminal comprises a first locking hole 140a formed at a side wall of the mounting receptacle 111a where one of the guiding rails 126a is formed. The locking unit further comprises a stopper 141 protruded from a side wall of the second body 120. The stopper 141 is designed to be depressed within the side wall of the second body 120 as the second body is slid along the guiding rails 126a of the first body. As the stopper encounters the first locking hole 140a, the stopper 141 becomes undepressed and is inserted in the first locking hole 140a. This allows the second body 120 to be locked at the first body 110 with a lower portion of the second body 120 exposed outside of an outer circumferential surface of the first body 110, as shown in FIG. 2.

Specifically, when the stopper 141 is locked in the first locking hole 140a, the second body 120 is mounted to the first body 110 with its second information input unit 122 and second sound input unit 124 exposed. However, the input parts 122a and 122b (as shown in FIG. 4) of the second information input unit 122 are preferably not exposed.

Figure 7:
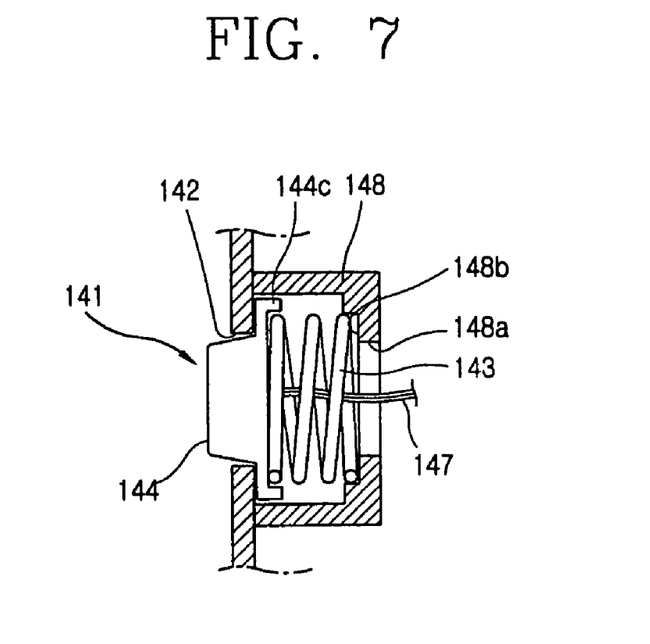
FIG. 7 is an enlarged side sectional view of a stopper of a detachable mobile terminal in accordance with one embodiment of the invention.

Referring to FIG. 7, the stopper 141 can be depressed into a side surface of the second body 120. As such, the stopper 141 comprises a protruded cover 144 installed at a through hole 142 formed at a side surface of the case 121 of the second body 120, wherein the protruded cover 144 has a portion exposed outside of the second body 120. The stopper further comprises a compression spring 143 connected to a surface of the protruded cover 144 and mounted at a spring installation wall 148 formed integrally with the case 121 in the through hole 142, wherein the compression spring has a predetermined compression displacement.

A safe mounting portion 144c is integrally formed at an outer circumferential surface of the protruded cover 144 so that the protruded cover 144 is supported at an inner wall of the through hole 142. The safe mounting portion 144c further serves as a safe mounting point for the compression spring 143. A safe mounting groove 148b is formed at a surface of the spring-installed wall 148 where the compression spring 143 is mounted. Athrough hole 148a is formed at a central portion of the safe mounting groove 148b and defines a passage through which a circuit line 147 connected to a circuit unit installed in the second body 120 passes. The circuit line 147 passes through the compression spring 143 and is connected to a surface of the protruded cover 144.

When force is applied to the protruded cover 144 from the outside, the stopper 141 is depressed into the second body 120. When the external force is removed, the stopper 141 returns to its initial state and is protruded outside of the second body 120. Referring to FIGS. 5 and 6, a first release button 147a for releasing the stopper 141 from the first locking hole 140a is installed at the first body 110 and in operation with the first locking hole 140a. The first release button has a portion exposed outside of the first body 110 so as to be manipulated by a user. Specifically, when the stopper 141 is inserted in the first locking hole 140a, the first release button 147a comes into surface-contact with the protruded cover 144. When a vertical contact force is applied to the protruded cover 144 of the stopper 141 by the user's manipulation of the first release button 147a, the stopper 141 is released from the first locking hole 140a. Accordingly, the second body 120 may be separated from the first body 110.

The locking unit 150 further comprises a second locking hole 140b formed at a side wall of the mounting receptacle 111a where one of the guiding rails 126a is formed. The second locking hole 140b allows the second body 120 to be fully mounted at the first body 110, i.e., no part of the second body is exposed outside of an outer surface of the first body 110. When the second body 120 is fully mounted at the first body 110, the stopper 141 is insertedly fixed to the second locking hole 147b.

A second release button 147b for releasing the stopper 141 from the second locking hole 140b is installed at the first body 110 and in operation with the second locking hole 140b. Like the first release button 147a, the second release button 147b is installed with a portion exposed outside of the first body 110 so as to be manipulated by a user. By applying a vertical contact force to the stopper 141 by the user's manipulation of the second release button 147b, the protruded cover 144 of the stopper 141 is depressed into the second body 120. Accordingly, the stopper 141 is released from the second locking hole 140b so that the second body 120 can be slid along the guiding rail 126a. Preferably, an end of the protruded cover 144 of the stopper 141 is curved with a great radius of curvature in order to promote easy detachment of the protruded cover 144 by a projection of the first locking hole 140a or the second locking hole 140b.

Figure 8:
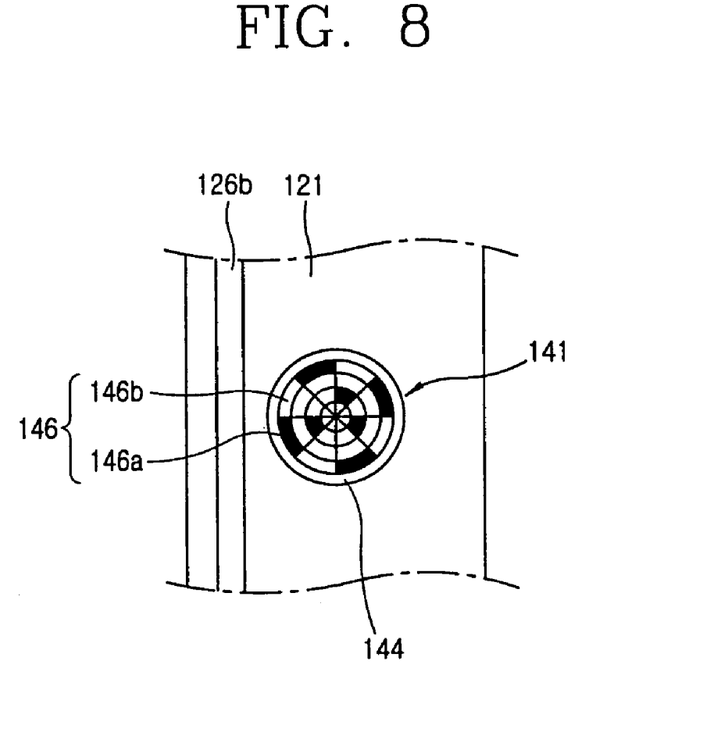
FIG. 8 is an enlarged front view of a stopper of a detachable mobile terminal in accordance with one embodiment of the invention.
Figure 9:
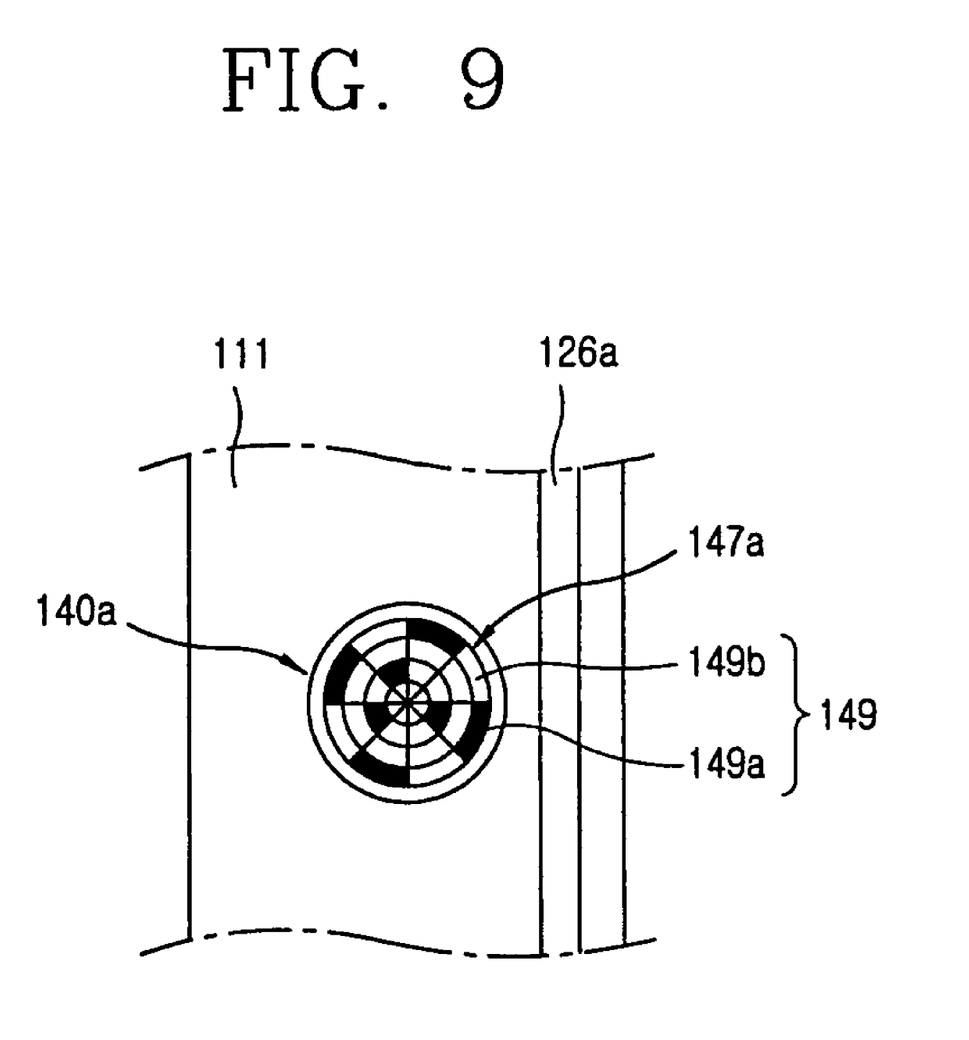
FIG. 9 is an enlarged front view showing a first locking hole of a detachable mobile terminal in accordance with one embodiment of the invention.

Referring to FIGS. 8 and 9, a lattice type terminal 149 connected to a circuit unit installed in the first body 110 is formed at a surface of the first release button 147a. Also, a lattice type terminal 146 connected to a circuit unit installed in the second body 120 is formed at a surface of the stopper 141 which comes into contact with the lattice type terminal 149 of the first release button 147a with a predetermined contact force.

As shown in FIGS. 7-9, a lattice type terminal 146 including signal portions 146a and insulating portions 146b for insulating between the signal portions 146a are formed at a protruded surface of the protruded cover 144 of the stopper 141. The signal portions 146a are connected to a circuit unit installed in the second body 120 by a signal line 147. In addition, a lattice type terminal 149 including signal portions 149a and insulating portions 149b for insulating between the signal portions 149a are formed at a surface of the first release button 147a of the first body 110, wherein the lattice type terminal 149 corresponds to the lattice type terminal 146 of the stopper 141. The signal portions 149a are connected to a circuit unit installed in the first body 110. Accordingly, the stopper 141 is inserted in the first locking hole 140a and comes into contact with the first release button 147a with a predetermined contact force, allowing the first body 110 and the second body 120 to exchange a communication signal by wire.

Additionally, information other than a communication signal may be exchanged when the lattice type terminal 149 of the first release button 147a and the lattice type terminal 146 of the stopper 141 are in contact with each other. For example, information regarding whether the first body 110 and the second body 120 are in contact with each other and information required to control mounting and separation of the second body 120 are exchanged through each signal portion 146a, 149a.

Moreover, a lattice type terminal having the same form as described above is formed at a surface of the second release button 147b installed at the second locking hole 140b. Dependent on whether the lattice type terminal of the second release button 147b and the lattice type terminal 146 of the stopper 141 are in contact with each other, it can be determined whether the second body 120 is fully mounted at the first body 110.

An elastic member, such as a plate spring, is preferably installed at a side wall of the mounting receptacle 111a. The elastic member is installed at an upper side of the first locking hole 140a in a direction that the second body 120 is slidingly mounted and applies an elastic force to the second body 120 in a direction that the second body 120 is slid. Preferably, a side surface of the second body 120 contacted with the elastic member has a structure that can sufficiently receive an elastic force of the elastic member when the second body 120 is fully mounted at the first body 110 or locked by the first locking hole 140*a*.

Hereinafter, a detachable mobile terminal for image communication in accordance with another embodiment of the invention will be described, and particularly, a structure wherein the first body 110 is slidingly mounted to the second body 120 and separated therefrom.

Figure 11:
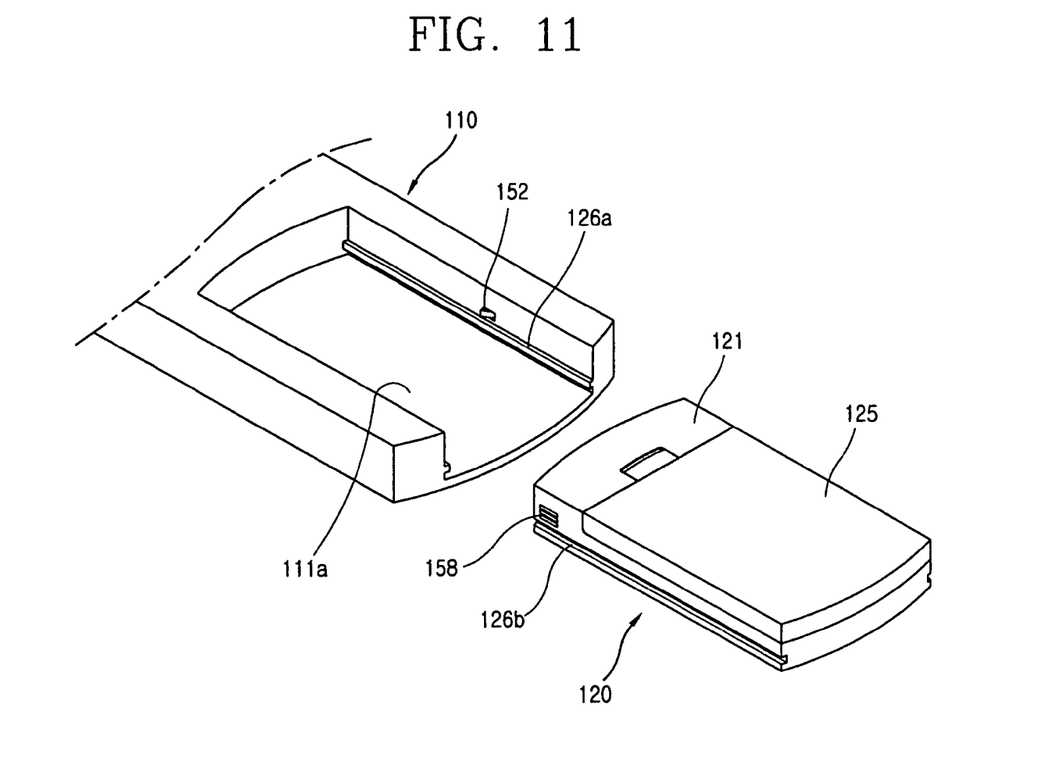
FIG. 11 is a perspective view of FIG. 10 viewed from a different direction.
Figure 12:
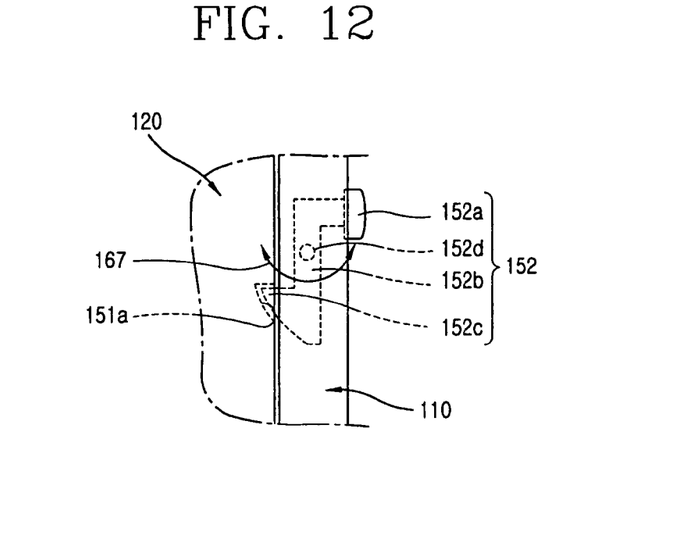
FIG. 12 is a partially-enlarged view of a hooking member of a detachable mobile terminal in accordance with one embodiment of the invention.

Referring to FIGS. 10-12, a locking unit 160 of a mobile terminal comprises a first hooking groove 151*a* recessed from a side surface of the second body 120 where a guiding groove 126*b* is formed. A second hooking groove 151*b* is also recessed from a side surface of the second body 120 where the guiding groove 126*b* is formed. The second hooking groove 151*b* is positioned above the first hooking groove 151*a* in a direction that the second body 120 is slidingly mounted to the first body 110. A hooking member 152 is formed at a sidewall of the mounting receptacle 111*a* and is hooked at the first or second hooking groove 151*a*, 151*b* when the second body 120 is slid along the guiding rails 126*a* of the first body 110 in a direction of being separated from the first body 110.

As shown in FIG. 12, the hooking member 152 comprises a button portion 152*a* having a portion exposed outside of the first body 110 for allowing an external force can to be applied thereto. A hook portion 152*c* is inserted in the first or second hooking groove 151*a*, 151*b* for hooking the second body 120 to the first body 110. A connecting portion 152*b* is integrally formed between the button portion 152*a* and the hook portion 152*c* and is rotated on a rotary shaft 152*d* protruded from a central portion of the connecting portion 152*b* in order to release the hook portion from the first or second hooking groove when a force is applied to the button portion. Additionally, a coil spring is mounted at the rotary shaft 152*d* for applying an elastic force to the connecting portion 152*b* for restoring the hooking member to an original position. Accordingly, the hooking member 152 can return to an initial position, i.e., a position approximately parallel with a side wall of the mounting receptacle 111*a*.

A surface of the hook portion 152*c* and surfaces of the first and the second hooking grooves 151*a*, 151*b*, which contact the surface of the hook portion when the second body 120 is slid in a direction of being mounted to the first body 110, are rollingly curved so as not to interrupt mounting of the second body 120. On the contrary, when the second body 120 is slid in a direction of being separated from the first body 110, the hook portion 152*c* of the hooking member 152 is hooked at the first hooking groove 151*a* or the second hooking groove 151*b*, so that the second body 120 is fixed to the first body 110. When the hook portion 152*c* of the hooking member 152 is hooked at the first hooking groove 151*a*, a portion of the second body 120, and particularly, a second information input unit 122 and a second sound input unit 124 formed at a surface of the second body 120 is exposed outside of an outer circumferential surface of the first body 110. Additionally, when the second body 120 is slid to be mounted to the first body 110, and the hook portion 152*c* of the hooking member 152 is hooked at the second hooking groove 151*b*, the second body 120 is not exposed outside of the outer circumferential surface of the first body 110, but is fully mounted at the first body 110.

When a force is applied to the button portion 152*a* of the hooking member 152 for releasing the second body 120 from the first body 110, the hook portion 152*c* is rotated on the rotary shaft 152*d* in a direction opposite to a direction that the button portion 152*a* is rotated. The hook portion is thereby released from the first or second hooking groove 151*a*, 151*b*. If a user grabs the second body 120 by hand and slides the second body 120 in a direction of being separated from the first body 110, the first body 110 and the second body 120 can be separated.

A first external terminal 158 connected to a circuit unit installed in the second body 120 is formed at a side surface of the second body 120. A second external terminal 150*a* and a third external terminal 157*b* connected to a circuit unit installed in the first body 110 are formed at a side surface of the mounting receptacle 111*a* of the first body 110. When the first hooking groove 151*a* of the second body 120 is hooked by the hooking member 152 and thus the second body 120 is fixed to the first body 110 with a lower portion exposed, the first external terminal 158 of the second body 120 and the second external terminal 150*a* of the first body 110 come in contact with each other. By such contact of the external terminals, the first body 110 and the second body 120 exchange a communication signal.

Moreover, information other than a communication signal may be exchanged when the first external terminal 158 of the second body 120 and the second external terminal 150*a* of the first body 110 are in contact with each other. For example information regarding whether the first body 110 and the second body 120 are in contact with each other and information required to control mounting and separation of the second body 120 are exchanged through the external terminals.

When the second body 120 is fully mounted at the first body 110, i.e., when the hooking member 152 is hooked by the second hooking groove 157*b*, the first external terminal 158 of the second body 120 and the third external terminal 157*b* of the first body 110 come in contact with each other. In this state, it is determined that the second body 120 is fully mounted at the first body 110.

Furthermore, it is contemplated that positions of the external terminals for determining whether the first body 110 and the second body 120 are in contact with each other and for wire communication exchange can be varied variously.

A method for operating the detachable mobile terminal for image communication, wherein the operating method is dependent upon whether the second body 120 is separated from the first body 110, will now be described.

First, an operating method of a detachable mobile terminal for image communication in accordance another embodiment of the invention comprises detecting whether a first body 110 and a second body 120 are separated from each other and making wireless communication between the first body 110 and the second body 120 if it is detected that the first body 110 and the second body 120 are separated from each other.

When a communication signal is received from a base station or transmitted to the base station, a user confirms that image communication is to be made through an image output unit 114 of the first body 110 and then separates the second body 120 from the first body 110. The mobile terminal thus detects separation of the first body 110 and the second body 120. The first body 110 and the second body 120 then exchange data wirelessly through a first radio signal exchange terminal 127 of the first body 110 and a second radio signal exchange terminal 128 of the second body 120. By pressing a communication button 112*b* on the second information input unit 122 of the separated second body 120, communication between a user and the other party is made. At this time, image communication is made through images of a user and the other party, which are displayed through the image output unit 114 of the first body 110. Preferably the image output unit 114 can output a divided image. Voice communication is made through the second sound input unit 124 and the second sound output unit 123 of the second body 120.

When the first body 110 and the second body 120 are in a separated state, the first body 110 preferably communicates with a base station, and the second body 120 communicates only with the first body 110 wirelessly. Alternatively, the second body 120 can communicate with the base station, and the first body 110 can transmit/receive data to/from the second body 120 through wireless communication. Wireless communication between the first body 110 and the second body 120 is preferably made using any one of a number of known methods such as a bluetooth (BT) method, an IrDA method and a radio frequency (RF) method or other personal area network method. If it is detected that the first body and the second body are not separated, the first body 110 and the second body 120 exchange a signal by wire.

Generally, the operating method of a mobile terminal in accordance with one embodiment of the invention is as follows. When the second body 120 is fully mounted at the first body 110 without being exposed outside of an outer circumferential surface of the first body 110, a communication button 113a of a first information input unit 113 on the first body 110 is pressed. Image communication is then made through an image output unit 114 of the first body 110. Simultaneously, voice communication via a user transmitting his/her voice through a first sound input unit 117 while listening to an amplified voice of the other party through a first sound output unit 116 is made. When the second body 120 is fully mounted at the first body 110, voice communication is made only through the first sound output unit 116 and the first sound input unit 117.

When the second body 120 is fixedly mounted at the first body 110 with the second information input unit 122 and the second voice input unit 124 exposed outside, voice communication can only be made through the first sound output unit 116 and the second sound input unit 124. Image communication is made through the image output unit 114. Simultaneously, voice communication via a user transmitting his/her voice through the second sound input unit 124 of the second body 120 while listening to an amplified voice of the other party through the first sound output unit 116 of the first body 110 can be made.

As so far described, the present invention provides a detachable mobile terminal for image communication comprising a first body including an image output unit and a second body slidingly mounted to the first body or separated therefrom. The mobile terminal thereby implements not only the same functions as a conventional mobile terminal but also facilitates image communication through an image output unit of the first body while at the same time providing for voice communication using the second body. The simultaneous dual communication is made possible by separating the second body from the first body.

Additionally, when the second body is separated from the first body, the first body and second body wirelessly communicate with each other. Therefore, an extra cable for connecting between the first body and the second body is not needed. Also, because the first and second body is detachable yet wirelessly functional, a user can simultaneously use the terminal for a voice and image communication function without the inconvenience of using a conventional ear-microphone. Thus, a user can communicate with another party more conveniently.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile terminal comprising:
 a first body comprising a rotatably installed image receiving unit, an image output unit, a first sound input unit, a first sound output unit, a first information input unit and a first wireless communication module;
 a second body comprising a second information input unit, a second sound input unit, a second sound output unit and a second wireless communication module, wherein the second body is capable of being slidingly mounted to the first body and separated from the first body and at least the image output unit, the first sound input unit, and the first sound output unit of the first body are exposed when the second body is slidingly mounted to the first body; and
 a locking unit for preventing separation of the second body from the first body,
 wherein the first and the second wireless communication modules of the first body and the second body are capable of wirelessly communicating with each other when the first body and the second body are detached from each other,
 wherein the locking unit comprises:
  a first locking hole formed at a side wall of a mounting receptacle; and
  a stopper protruded from a side wall of the second body, wherein the stopper is capable of being depressed into the side wall of the second body when the second body is slid along a guiding rail and insertable in the first locking hole for locking the second body by the first body with a portion of the second body exposed outside of an outer circumferential surface of the first body.

2. The mobile terminal of claim 1, further comprising:
 a first radio signal exchange terminal connected to the first wireless communication module of the first body and formed at a side of the first body; and
 a second radio signal exchange terminal connected to the second wireless communication module of the second body and formed at a side of the second body,
 wherein when the second body is detached from the first body, the first body and the second body wirelessly communicate with each other through the first and the second radio signal exchange terminals.

3. The mobile terminal of claim 1, wherein wireless communication through the first and the second wireless communication modules employs one of a bluetooth method, an IrDA method and a radio frequency (RF) method.

4. The mobile terminal of claim 1, wherein the mounting receptacle is formed at a surface of the first body for mounting the second body.

5. The mobile terminal of claim 4, wherein the mounting receptacle is recessed from the surface of the first body at a predetermined depth and corresponds to a size and a shape of the second body.

6. The mobile terminal of claim 5, wherein guiding rails are formed at side walls of the mounting receptacle at a predetermined length for slidingly mounting the second body onto the mounting receptacle and guiding grooves are formed at side surfaces of the second body for operating with the guiding rails.

7. The mobile terminal of claim 1, further comprising a first release button formed on the first body at the first locking hole, the first release button having a portion exposed outside of the first body for applying a vertical contact force to the stopper for releasing the stopper from the first locking hole.

8. The mobile terminal of claim 1, wherein the locking unit further comprises a second locking hole formed at the side wall of the mounting receptacle and the stopper is insertable in the second locking hole for fully mounting the second body at the mounting receptacle.

9. The mobile terminal of claim 8, further comprising a second release button formed on the first body at the second locking hole, the second release button having a portion exposed outside of the first body for applying a vertical contact force to the stopper for releasing the stopper from the second locking hole.

10. The mobile terminal of claim 8, further comprising:
a lattice type terminal connected to a circuit unit of the first body and formed at a surface of the first release button; and
a lattice type terminal connected to a circuit unit of the second body and formed at a surface of the stopper,
wherein the lattice type terminal of the first release button and the lattice type terminal of the stopper can exchange a signal when the stopper is inserted in the first locking hole and contacts the first release button.

11. The mobile terminal of claim 1, wherein the second body is locked by the first body with the second information input unit and the second sound input unit exposed.

12. The mobile terminal of claim 1, wherein the second body is capable of being separated from the first body when the stopper is separated from the first locking hole.

13. The mobile terminal of claim 1, wherein an end of a protruded cover of the stopper is curved.

14. The mobile terminal of claim 1, wherein the image receiving unit comprises a camera module and a flash.

15. The mobile terminal of claim 1, wherein the image output unit outputs a plurality of images displayed on a main region and an auxiliary region of the image output unit.

16. The mobile terminal of claim 15, wherein the image output unit outputs images of a receiving side and a transmitting side.

17. The mobile terminal of claim 1, wherein the locking unit is configured to lock the second body at more than one sliding position of the first body.

18. The mobile terminal of claim 1, wherein the image receiving unit, the image output unit, the first sound input unit, the first sound output unit, and the first information input unit are formed on a same side of the first body.

19. A mobile terminal comprising:
a first body comprising a rotatably installed image receiving unit, an image output unit, a first sound input unit, a first sound output unit, a first information input unit and a first wireless communication module;
a second body comprising a second information input unit, a second sound input unit, a second sound output unit and a second wireless communication module, wherein the second body is capable of being slidingly mounted to the first body and separated from the first body and at least the image output unit, the first sound input unit, and the first sound output unit of the first body are exposed when the second body is slidingly mounted to the first body; and
a locking unit for preventing separation of the second body from the first body,
wherein the first and the second wireless communication modules of the first body and the second body are capable of wirelessly communicating with each other when the first body and the second body are detached from each other,
wherein the locking unit comprises:
a first hooking groove recessed from a side surface of the second body where a guiding groove is formed;
a second hooking groove recessed from the side surface of the second body where the guiding groove is formed, wherein the second hooking groove is positioned above the first hooking groove in a direction that the second body is slidingly mounted to the first body; and
a hooking member formed at a side surface of a mounting receptacle and hooked at one of the first and the second hooking grooves when the second body is slid along a guiding rail in a direction of being separated from the first body.

20. The mobile terminal of claim 19, wherein the hooking member comprises:
a button portion having a portion exposed outside of the first body for allowing an external force to be applied to the button portion;
a hook portion inserted in one of the first and the second hooking grooves for hooking the second body to the first body;
a connecting portion formed integrally between the button portion and the hook portion and rotated on a rotary shaft protruded from a central portion of the connecting portion for releasing the hook portion from one of the first and the second hooking grooves when the force is applied to the button portion; and
a coil spring mounted at the rotary shaft for applying an elastic force to the connecting portion for restoring the hooking member to an original position.

21. The mobile terminal of claim 20, wherein a surface of the hook portion and surfaces of the first and the second hooking grooves which contact the surface of the hook portion when the second body is slid in a direction of being mounted at the first body are formed with a curved profile.

22. The mobile terminal of claim 20, wherein when the hook portion is hooked at the first hooking groove, a portion of the second body is exposed outside of an outer circumferential surface of the first body.

23. The mobile terminal of claim 22, wherein the second information input unit and the second sound input unit of the second body are exposed outside when the hook portion is hooked at the first hooking groove.

24. The mobile terminal of claim 20, wherein when the hook portion is hooked at the second hooking groove, the second body is fully mounted at the first body.

* * * * *